May 24, 1949. G. C. CURTIS 2,471,314
GATHERING HEAD FOR COTTON HARVESTING MACHINES
Filed April 10, 1944
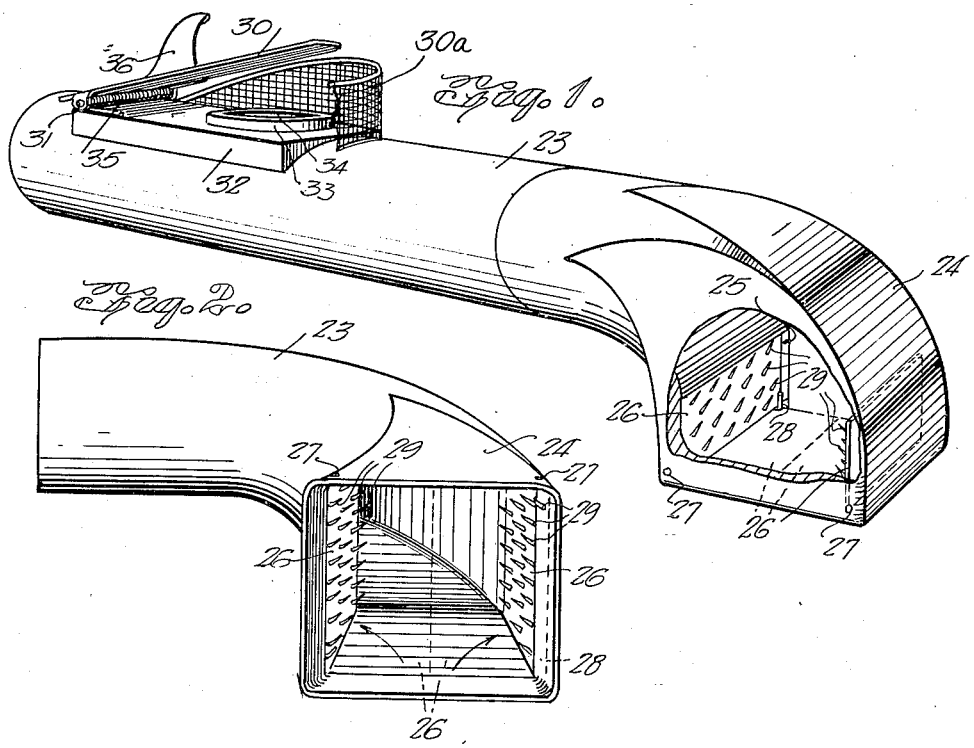
GROVER C. CURTIS
INVENTOR.
BY
ATTORNEY Patented May 24, 1949

2,471,314

UNITED STATES PATENT OFFICE 2,471,314

GATHERING HEAD FOR COTTON HARVESTING MACHINES

Grover C. Curtis, Bryan, Tex.

Application April 10, 1944, Serial No. 530,308

1 Claim. (Cl. 56—32)

This invention relates to cotton harvesting machines and equipment and it has particular reference to certain new and useful improvements in gathering or picker heads for suction type harvesting machines.

Harvesting of cotton by suction or vacuum is not in itself new and various types of picker heads have been designed for the utilization of suction to draw the cotton from the bur and thus reduce materially the labor and costs in harvesting. However, it has been found that unless the suction through a suitable conduit, preferably a flexible hose, conveying the cotton to a receptacle, is adequately controlled, much time is lost by interference set up by the foliage on the stalks and causes frequent breakage of the vacuum due to accumulation of such foliage in the orifice of the gathering head. Moreover, much trash and leaves are entrained with the cotton which requires elaborate cleaning equipment for its extraction if the grade of the cotton is not to be reduced by the presence of trash.

The principal object of the present invention is to provide a gathering head which may be readily adapted to any type of vacuum system, either manually or power drawn and which, by virtue of a valve mounted on the shank of the head, the intake of air at the orifice of the latter may be suspended or resumed quickly and conveniently at the will of the operator and this feature, combined with the fact that provision is made at the orifice to initially engage the cotton in the bur to aid suction in dislodging it, enables the operator of the picking head to evade the foliage without difficulty in manipulating the nozzle of the head over the stalk in quest of open balls containing mature cotton.

Another object of the invention is to provide a picker head which has but a minimum of moving parts, is light and convenient to handle, and one which reduces materially the time consumed in hand picking by obviating the motion of transferring the cotton from the hand to a sack drawn behind the picker.

With the foregoing objects as paramount, the invention has further reference to certain features of accomplishment which will become apparent as the description proceeds, taken in connection with the accompanying drawings wherein:

Figure 1 is a perspective view of a picker or gathering head embodying the invention.

Figure 2 is a view of the gathering head rotated approximately 90° to disclose the extractors in the picker head orifice.

Continuing with a more detailed description of the drawing, a tube or shank 23 is provided, in one end of which is detachably mounted a picker head 24. This head has a nozzle orifice which is preferably square and within the walls of the nozzle there is provided recesses 25 to accommodate small plates 26, hinged by means of shafts 27 extending from one side to the other at the base of each recess and surrounded by torsion springs 28. The springs 28 are very light and serve only to return the extractor plates 26 to closed position when the valve in the tube 23 is opened. This valve will be described in detail presently.

The extractor plates 26 contribute materially to the successful performance of the picker head in that the plates, being closed at the time the nozzle is thrust against the cotton, will, by virtue of the multiplicity of sharp pointed pins 29 in the exterior faces of the plates, cause an initial dislodging action of the cotton from the ball when the valve in the shank 23 is closed. The rapid movement of air through the nozzle will thrust the extractor plates inwardly on their hinges against the resistance of their torsion springs and in so moving, the pins 29, which are disposed at an angle in relation to the surface on which they are mounted, exert a pulling force on the lint impaled thereon in a direction toward the center of the nozzle orifice. This force tends to pull the locks of cotton from the bur and since the valve is now closed the full force of the suction through the head is exerted on the cotton and it is caused to pass swiftly through the tube into a suitable receptacle to which the tube is attached. Immediately upon opening the valve, the springs 28 return the extractors to closed position preparatory to further operation.

The valve referred to in the foregoing description dealing with the modified form of the invention consists of a plate 30 in Figure 1, hinged on a shaft 31 mounted across one end of a plate or block 32 affixed to the shank 23. An annular flange 33 surrounds a screen covered opening or orifice 34 in the shank and is machined so that the plate 30, when lowered, will lie flush thereagainst. A torsion spring 35 surrounds the shaft 31 on which the valve plate is hinged and holds the plate normally open until pressed down by the thumb of the hand holding the picker head. A thumb rest 36 is mounted on the plate 30.

The screen 30a is of substantially U-shape, the legs thereof being disposed, one on each side of the orifice 34 and whose upper edges are inclined rearwardly. The under edges of the screen are shaped to conform to the contour of the tube 23 and are soldered, welded or otherwise affixed to the latter so that the screen will be rigid and serve to prevent fouling of the valve 30.

It is apparent from the foregoing that the lint is drawn pneumatically and mechanically from the bur and carried pneumatically to the receptacle. However, without the air, the dislodging action of the extractors would be of little or no practical value. It is considered important that where the extractors are movable, movement is caused solely by the air moving through the tube and no other means of operation thereof is employed except, of course, such displacement thereof as would be caused by thrusting the nozzle of the picker head against the cotton on the stalk.

Manifestly, the construction as shown and described is capable of some modification and such modification as may be construed to fall within the scope and meaning of the appended claim is also considered to be within the spirit and intent of the invention.

What is claimed is:

A gathering head for cotton harvesters including a suction tube having an orifice therein, a nozzle on one end of said tube opening at right angles to the longitudinal axis of the tube, a pair of substantially flat plates hinged on opposite sides of said nozzle opening and influenced by suction through said tube to open inwardly thereof, a multiplicity of cotton impaling prongs carried by each of said plates and inclined towards the midsection of said nozzle, a valve hinged to said suction tube and movable to open and close the orifice in said tube and a substantially U-shaped, foraminous guard affixed to said tube and partially embracing said orifice.

GROVER C. CURTIS.

REFERENCES CITED

The following references are of record in the file of this patent:

UNITED STATES PATENTS

| Number | Name | Date |
| --- | --- | --- |
| 1,109,525 | Hartwell, Jr. | Sept. 1, 1914 |
| 1,120,980 | Schofield | Dec. 15, 1914 |
| 1,184,151 | Tulley | May 23, 1916 |
| 1,324,549 | Hulse | Dec. 9, 1919 |
| 1,529,846 | Oberle | Mar. 17, 1925 |
| 1,794,243 | Post | Feb. 24, 1931 |
| 2,169,259 | Lakin | Aug. 15, 1939 |